United States Patent

[11] 3,582,744

| [72] | Inventors | Leo G. Coffey<br>Garland;<br>Luces M. Faulkenberry, Arlington, Tex. |
|---|---|---|
| [21] | Appl. No. | 679,149 |
| [22] | Filed | Oct. 30, 1967 |
| [45] | Patented | June 1, 1971 |
| [73] | Assignee | Varo, Inc.<br>Garland, Tex. |

[54] MOTOR SPEED CONTROL WITH PHOTORESISTIVE ELEMENT
6 Claims, 6 Drawing Figs.

[52] U.S. Cl. .................................................. 318/313, 318/345
[51] Int. Cl. ...................................................... H02p 5/16
[50] Field of Search ........................................... 318/313, 480; 323/21

[56] References Cited
UNITED STATES PATENTS

| 3,271,648 | 9/1966 | Weed | 318/331 |
| 3,328,662 | 6/1967 | Gambill | 318/480X |
| 3,335,291 | 8/1967 | Gutzwiller | 307/88.5 |
| 3,360,713 | 12/1967 | Howell | 373/22 |
| 3,361,931 | 1/1968 | Vollrath | 315/158 |
| 3,381,212 | 4/1968 | Peltola | 323/21 |
| 3,424,967 | 1/1969 | Keller | 318/313X |

Primary Examiner—Oris L. Rader
Assistant Examiner—Thomas Langer
Attorneys—Roy W. Olson, Richard R. Trexler, Robert M. Walters, Richard Bushnell and John S. Fosse ABSTRACT: A control circuit for series wound DC and universal motors which compensates for line voltage variations, maintaining constant power output from the motor even though the line voltage fluctuates over a wide range. A voltage regulator with a photoresistive control element whose impedance increases or decreases in inverse proportion to the increase or decrease in the line voltage.

INVENTORS:
LEO GEORGE COFFEY
LUCES MAURICE FAULKENBERRY
BY: *Arthur M. Sloan*
ATTORNEY

INVENTORS:
LEO GEORGE COFFEY
LUCES MAURICE FAULKENBERRY

BY *Tucker M. Sloan*

ATTORNEY

MOTOR SPEED CONTROL WITH PHOTORESISTIVE ELEMENT

This invention relates to a motor control circuit for controlling series wound DC and universal motors. The circuit may be used generally for voltage control and regulation. The control circuit of the invention allows full torque to be delivered to a motor load over a 20-to-1 speed range, and further allows constant speed operation over the range of loads for which the motor is designed.

The control circuit of the invention compensates for line voltage variations, maintaining constant power output from the motor even though the line voltage fluctuates over a wide range.

The feedback arrangement of the circuit makes it less costly than other circuits known in the art.

The invention circuit may be used to control fractional horse power motors in the one-twentieth to one-half horse power range. The circuit may also be used in many other applications.

The principals of the invention may be utilized to provide feedback in a full-wave or a half-wave control.

The invention may be likened to a solid-state equivalent of a variac with the added inherent property of automatic correction for changes in line voltage within some reasonable limits.

The basic control element in the control circuit is a photoresistor such as a cadmium sulfide photocell in which the bulk resistivity of the device is a function of the spectral content and intensity of incident radiation (actually the number and energy level of photons incident upon the material per unit area per unit time). This photoresistor whose resistance is a function of incident light flux controls the conduction angle of an SCR or triac or similar device. The resulting mode of control is either full- or half-wave phase control. The light flux density may be controlled in several ways including: controlling the size of an aperture, varying the density of a filter, or varying the applied voltage to the light source. Variation in light flux density and hence resistance with applied voltage is used to perform the function of line voltage regulation. The level of voltage about which the regulation occurs is adjustable by adjusting the aperture opening, thereby causing the photoresistor to function in a manner similar to an infinite resolution potentiometer without mechanical wiper contacts.

In full-wave or half-wave control the light source photoresistor combination is used to perform the function of a potentiometer. Feedback is also included through use of a second illumination source for the photoresistor. It can be accomplished by inserting a neon bulb in the circuit in such a manner that it is placed in series with the armature and fields of a universal motor so that the light flux intensity becomes a function of the load current drawn by the motor.

It is an object of the invention to provide a control circuit which compensates for line voltage variations, maintaining constant power output from the motor, even though the line voltage fluctuates over a wide range.

Another object of the invention is to provide a control circuit whose feedback arrangement makes it less costly than other circuits known in the art.

Further objects and advantages of the present invention will be apparent from the following description, reference being had to the accompanying drawings wherein preferred embodiments of the present invention are clearly shown.

Figure 1:
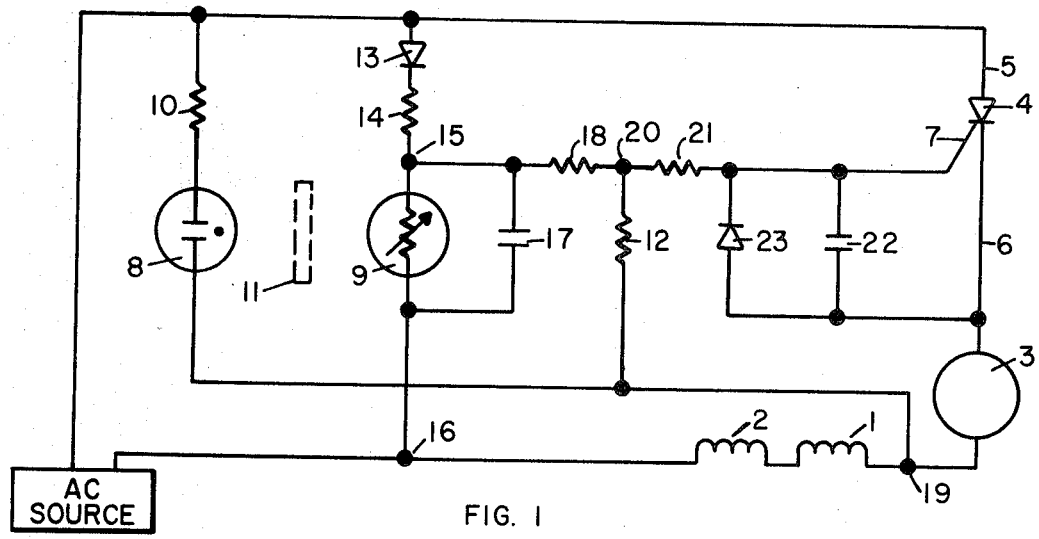
FIG. 1 is a schematic diagram of one embodiment of the circuit of the invention.

Referring to FIG. 1, the circuit operates as follows:

AC line voltage is applied across the series combination of the motor fields 1 and 2, armature 3, and SCR 4. The anode electrode 5 of the SCR 4 is connected to one side of the AC input line. The other side of the AC input line is connected to the side of the field windings remote from the armature 3. The armature 3 is connected between the field windings and the cathode electrode 6 of the SCR 4. The field windings 1 and 2 are connected in series. The average voltage applied to the motor is controlled by the SCR 4.

The SCR 4 is a semiconductor device that exhibits a high impedance ($10^4$ ohms typically) in both directions until a low positive voltage is applied to the gate electrode 7 while the anode electrode 5 is positive with respect to the cathode electrode 6. At this time the SCR 4 turns on and becomes a very low impedance (less than one ohm typically). The SCR 4 remains on until the current through the SCR 4 drops below the holding current (i.e., the current below which the SCR 4 resumes its high impedance or blocking state) or the voltage to the cathode electrode 6 and anode electrode 5 is reversed or removed. Then the SCR 4 turns off and resumes its high impedance state.

In this circuit, control is achieved by varying the length of time the SCR 4 is on during the half cycle that the anode electrode voltage is positive with respect to the cathode electrode 6. Varying the time the SCR 4 is on during the positive cycle varies the average voltage to the motor load. The greater the time the SCR 4 is on, the greater the average voltage to the load. The SCR 4 is off during the half cycle that the anode electrode 5 voltage is negative with respect to the cathode electrode 6. In this manner the average voltage applied to the load is controlled.

Speed control is accomplished in the following manner:

Neon lamp 8 is optically coupled to the photocell or photoresistor 9. A light source other than a neon lamp may also be used. Resistor 10 is in series with neon lamp 8 and limits the current through neon lamp 8. When line voltage is applied, neon lamp 8 glows. As the amount of light from neon lamp 8 that hits the photoresistor 9 is reduced, the photoresistor 9 impedance increases and as more light is allowed to shine on the photoresistor 9, its impedance decreases.

The amount of light allowed to shine on the photoresistor 9 is controlled mechanically by an adjustable aperture 11. The amount of light allowed to shine on the photoresistor 9 may also be controlled electrically by a potentiometer in series with resistor 10.

Diode 13, resistor 14, and the photoresistor 9 comprises a half-wave voltage divider across the line. As the photoresistor 9 impedance increases the voltage at point 15 increases with respect to point 16. Conversely as the photoresistor 9 impedance decreases the voltage at point 15 decreases with respect to point 16. Capacitor 17 is in parallel with the photoresistor 9 and holds the half-wave voltage at point 15 at a constant DC level during both half cycles of the line voltage.

Resistor 18 and resistor 1 2 comprise another voltage divider from point 15 to point 19 between the armature 3 and the field 1. This divider attenuates the voltage between points 15 and 19 and applies the attenuated voltage at point 20.

Resistor 21 and capacitor 22 are an RC time delay that provides an exponential ramp voltage at the gate electrode 7 of the SCR 4. The time required for capacitor 22 to charge to a voltage sufficient to fire the SCR 4 is determined by the magnitude of the voltage at point 20. The voltage at point 20 is determined by the voltage at point 15 which is determined by the impedance of the photoresistor 9. The impedance of the photoresistor 9 is varied by varying the amount of light allowed to reach the photoresistor 9.

If the motor is running at a certain speed and the amount of light reaching the photoresistor 9 is reduced by a mechanical adjustment to the aperture 11 between the photoresistor 9 and neon bulb 8, the impedance of the photoresistor 9 will rise.

This will cause the voltage at points 15 and 20 to rise. Capacitor 22 will then charge to a higher voltage and less time will elapse each positive half cycle before capacitor 22 charges to the firing point of the SCR 4. Since the SCR 4 will be firing earlier each positive half cycle, a higher average voltage will be applied to the motor, and its speed will increase. If more light is allowed to strike the photoresistor 9, the impedance of the photoresistor 9 will reduce reversing the above process, and the motor speed will reduce.

Feedback (speed remaining constant with varying loads) is accomplished in the circuit in the following manner:

If while the motor is running at a certain speed, the load on the motor is increased, the armature will start to slow down, and the current through the motor will increase. Since the voltage drop across the fields in a series motor is inversely proportional to the motor speed, as the motor starts to slow down, the voltage across the fields will start to increase. This causes the voltage at point 19 to rise and subtract from the voltage applied to neon lamp 8. Because neon lamp 8 now has less voltage across it, its light output decreases, and less light is applied to the photoresistor 9. The impedance of the photoresistor 9 increases and the voltage at point 15 increases. This higher voltage is held constant by capacitor 17. Both ends of the voltage divider, resistor 18 and resistor 12, are now at a higher potential. Accordingly capacitor 22 must charge to the higher voltage which is now present at point 20, and the SCR 4 is triggered earlier in the positive half cycle. Thus a higher average voltage is applied to the motor, and its speed increases. As the motor speed increases to where the load is maintained at its original speed, the voltage across the filed becomes constant, and the light no longer continues to dim so that the impedance of the photoresistor 9 is maintained at its new level. Thus the time that the SCR 4 is turned on during the positive half cycle is maintained at a new higher level, and the motor speed is constant. If the motor load decreases, the motor speed starts to increase, and the reverse of the above process takes place.

Diode 23 is connected in parallel with capacitor 22 to limit the amount of reverse charge capacitor 22 stores during the portion of the cycle that SCR 4 is conducting.

Line voltage regulation is accomplished by the varying line, which varies the light output of neon bulb 8. As the line voltage decreases the light output of neon bulb 8 decreases causing the photoresistor 9 impedance to increase. As noted, the increase of the photoresistor 9 impedance causes the SCR 4 to be fired earlier in the half cycle maintaining the average voltage applied to the motor. As the line voltage increases, the light output of the neon bulb 8 increases causing the photocell 9 impedance to decrease. As a result, the SCR 4 fires later in the positive half cycle and the motor speed is not affected by the increase in line voltage.

Figure 2:
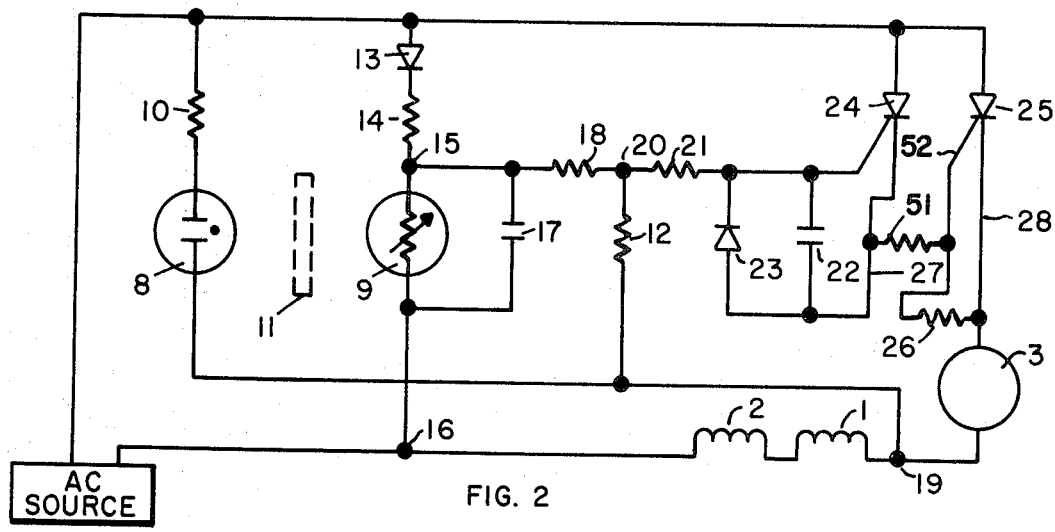
FIG. 2 is a schematic diagram of a variation of the circuit of FIG. 1 wherein a low current SCR is used to trigger a higher current SCR.

In FIG. 2, the circuit works the same as the circuit of FIG. 1; however, low current SCR 24 is used to trigger higher current SCR 25. Also, resistor 51 is connected between the cathode electrode 27 of SCR 24 and the gate electrode 52 of SCR 25 in order to hold the amount of gate trigger current supplied by SCR 24 to a sufficient but not excessive value. Resistor 26 is shunted across the gate electrode 52 and cathode electrode 28 of SCR 25 in order to lower the effective output impedance of the gate electrode circuit to render the higher current silicon controlled rectifier 25 less sensitive to false triggering from spurious noise voltages.

Figure 3:
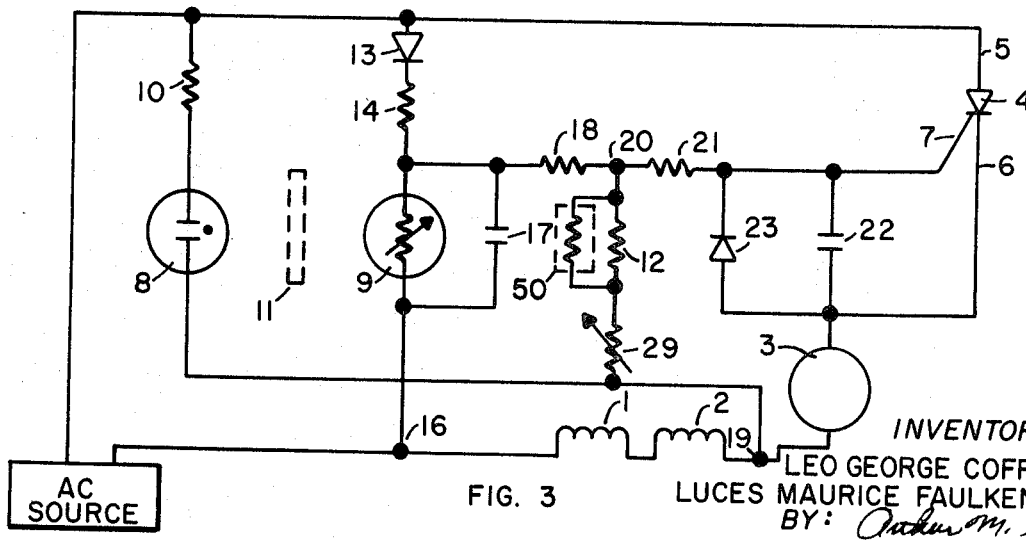
FIG. 3 is a schematic diagram of a variation of the circuit of FIG. 1 wherein a potentiometer is connected in the circuit to adjust speed.

In FIG. 3, potentiometer 29 is connected in series with resistor 12 to provide adjustment of the speed where the mechanical aperture 11 is held constant.

In FIG. 1, resistors 18, 21, and 12 may be varied in value where necessary to obtain stable operation from the motor. In motors one-third horse power and above, resistor 14 may be decreased in value where necessary to obtain stable operation of the motor.

In the circuits of FIGS. 1 through 3, a thermistor 50 may be placed in parallel with resistor 12 for temperature compensation as shown in FIG. 3.

Figure 4:
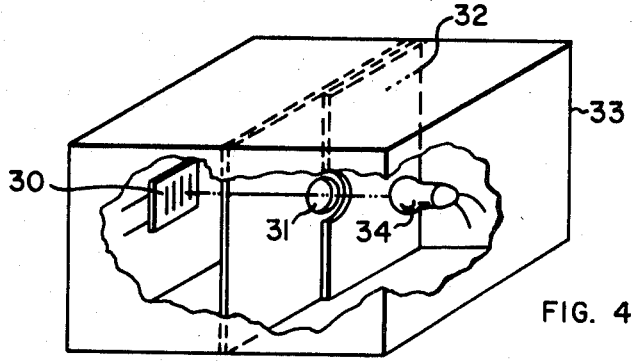
FIG. 4 is a cut away perspective view showing one possible mechanical aperture arrangement.

FIG. 4 shows one mechanical aperture arrangement. Other arrangements may be used. The elements of FIG. 4 are photocell 30, fixed aperture 31, externally adjustable shutter 32, lightproof receptacle 33, and fixed light source 34.

It is to be understood that in all of the embodiments of the invention any suitable fixed light source may be used.

Figure 5:
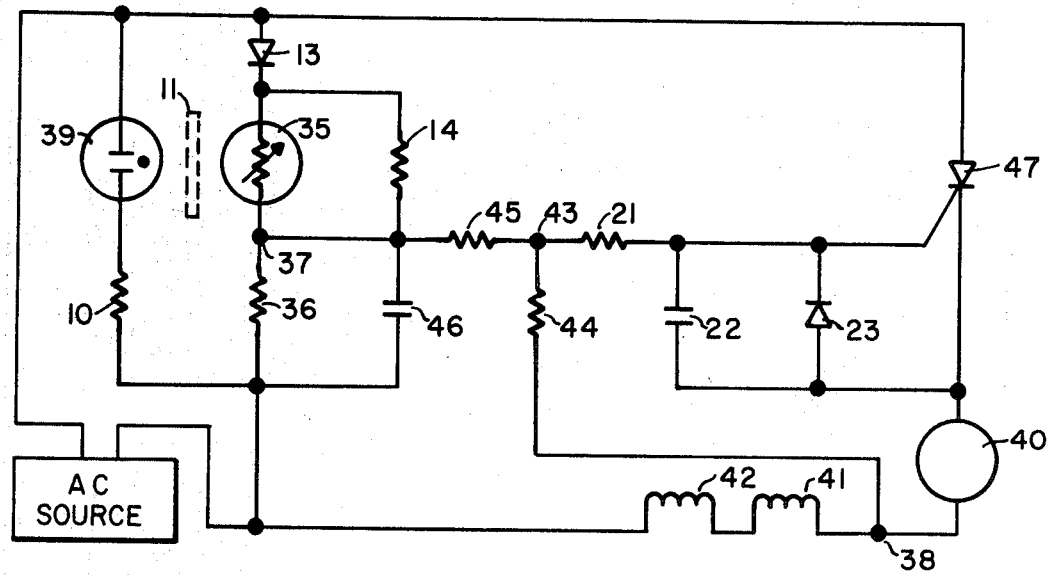
FIG. 5 is a schematic diagram of another variation of the circuit of FIG. 1.

FIG. 5 shows an adaptation of the circuit of FIG. 1. This circuit has a soft start feature that allows torque to be applied smoothly to a motor load. The differences of this circuit from the circuit of FIG. 1 will be discussed. The photoresistor 35 and resistor 36 comprise a voltage divider. The voltage at point 37 is made more positive with respect to point 38 by increasing the amount of light allowed to shine on the photoresistor 35. Increasing the light on the photoresistor 35 decreases the photoresistor 35 impedance causing the voltage at point 37 to become more positive with respect to point 38. Changing the voltage at point 37 controls speed as described in the discussion of FIG. 1.

The lamp 39 is a light source only. Feedback is accomplished in the following manner. If, while the motor is running at a certain speed, the load on the motor is increased, the armature 40 will start to slow down, and the voltage across the fields 41 and 42 will start to rise. This rising field voltage is felt at point 43 through resistor 44 and at point 37 through resistor 45. The higher voltage at point 37 is stored by capacitor 46. Since the voltage at point 43 is higher, the SCR 47 fires earlier in the positive half cycle as described in the discussion of FIG. 1. When the field voltage ceases to rise, the voltage at point 43 remains constant. The constant voltage at point 43 holds the time that the SCR 47 is on during the positive half cycle of line voltage until the motor load changes.

Figure 6:
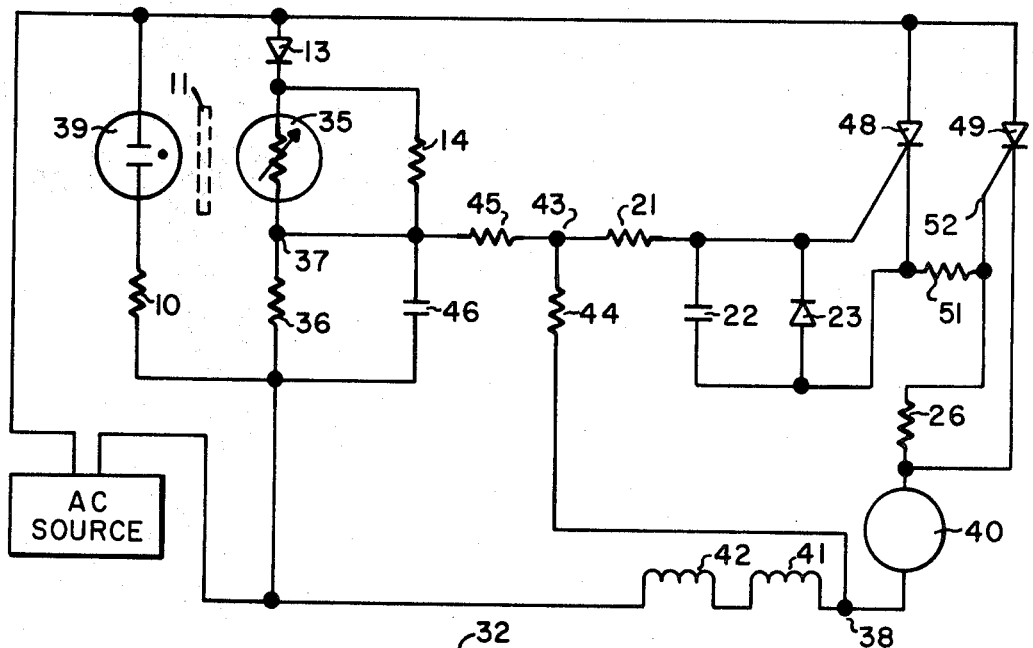
FIG. 6 is a schematic diagram of a form of the circuit of FIG. 5 wherein a low current SCR is used to trigger a high current SCR.

FIG. 6 is similar to FIG. 5 except that a low current SCR, SCR 48, is used to trigger a higher current SCR, SCR 49. Resistors 51 and 26 perform the same functions as in the circuit of FIG. 2. Otherwise circuit operation is the same as the circuit of FIG. 5.

While the embodiments of the present invention as herein disclosed, constitute preferred forms, it is to be understood that other forms might be adopted.

We claim:

1. A motor control circuit including a source of power; a motor to be controlled; a photocell; at least one silicon controlled rectifier wherein control is achieved by varying the length of time that the silicon controlled rectifier anode electrode voltage is positive with respect to its cathode electrode voltage and having its anode electrode connected to one side of the source of power, its cathode electrode connected to the motor armature of said motor, and its gate electrode connected between one end of the photocell and the source of power intermediate said source of power and the anode electrode of the silicon controlled rectifier; a capacitor connected at one of its ends between the gate electrode of the silicon controlled rectifier and the photocell and at its other end between the cathode electrode of the silicon controlled rectifier and the motor armature; a light source connected at one of its ends intermediate the source of power and the anode electrode of the silicon controlled rectifier and at its other end between the motor armature and the motor field windings of said motor; an adjustable aperture for controlling the amount of light allowed to shine on the photocell from the light source wherein the impedance of the photocell is varied by varying the amount of light allowed to reach the photocell with the impedance of the photocell determining the length of time that the silicon controlled rectifier anode electrode voltage is positive with respect to its cathode electrode voltage; the other end of the photocell being connected to the other side of the source of power so that when line voltage from the source of power is applied to the light source, the light source emits light, and as the amount of light reaching the photocell changes the impedance of the photocell changes causing the time for charging said capacitor to change resulting in a change in conduction time of said silicon controlled rectifier whereby the speed of said motor is varied; a diode and a resistor connected in series with the photocell between its points of connection with the gate electrode of the silicon controlled rectifier and the source of power and with the photocell comprising a half-wave voltage divider across the source of power; a second diode connected in parallel with said capacitor and a second resistor connected to the gate electrode of the silicon controlled rectifier intermediate the photocell and the capacitor with said second resistor and said capacitor constituting and RC time delay that provides an exponential ramp voltage at the gate electrode of the silicon controlled rectifier; and feedback means to maintain constant speed with varying loads and including a second capacitor connected in parallel with the photocell, a third resistor connected at one of its ends to the second capacitor and at its other end between the light source and the motor field windings and a fourth resistor connected between the third resistor and the second capacitor, the third and fourth resistors constituting a voltage divider and the second capacitor acting to maintain the voltage constant between the fourth resistor and the photocell.

2. A motor control circuit including a source of power; a motor to be controlled; a photocell; at least one silicon controlled rectifier wherein control is achieved by varying the length of time that the silicon controlled rectifier anode electrode voltage is positive with respect to its cathode electrode voltage and having its anode electrode connected to one side of the source of power, its cathode electrode connected to the motor armature of said motor, and its gate electrode connected between one end of the photocell and the source of power intermediate said source of power and the anode electrode of the silicon controlled rectifier; a capacitor connected at one of its ends between the gate electrode of the silicon controlled rectifier and the photocell and at its other end between the cathode electrode of the silicon controlled rectifier and the motor armature; a light source connected at one of its ends intermediate the source of power and the anode electrode of the silicon controlled rectifier and at its other end between the motor armature and the motor field windings of said motor; an adjustable aperture for controlling the amount of light allowed to shine on the photocell from the light source wherein the impedance of the photocell is varied by varying the amount of light allowed to reach the photocell with the impedance of the photocell determining the length of time that the silicon controlled rectifier anode electrode voltage is positive with respect to its cathode electrode voltage; the other end of the photocell being connected to the other side of the source of power so that when line voltage from the source of power is applied to the light source, the light source emits light, and as the amount of light reaching the photocell changes the impedance of the photocell changes causing the time for charging said capacitor to change resulting in a change in conduction time of said silicon controlled rectifier whereby the speed of said motor is varied; a resistor connected between the photocell and the other side of the source of power with said resistor being also connected, at its end remote from the photocell, between the light source and motor armature; a diode connected in series with the photocell between its points of connection with the gate electrode of the silicon controlled rectifier and the source of power and a second resistor connected in parallel with the photocell and between the diode and the photocell; a a second diode connected in parallel with the capacitor and a third resistor connected to the gate electrode of the silicon controlled rectifier intermediate the photocell and the capacitor with said third resistor and the capacitor constituting an RC time delay that provides an exponential ramp voltage at the gate electrode of the silicon controlled rectifier; and feedback means to maintain constant speed with varying loads and including a second capacitor connected in parallel with the first resistor and in series with the second resistor, a fourth resistor connected at one of its ends to the second capacitor and at its other end between the motor armature and the motor field windings and a fifth resistor connected between the fourth resistor and the second capacitor, the fourth and fifth resistors constituting a voltage divider and the second capacitor acting to maintain the voltage constant between the fifth resistor and the photocell.

3. A motor control circuit as described in claim 1 including a fifth resistor in series with the light source to limit the current through the light source.

4. A motor control circuit as described in claim 1 including a potentiometer in series with the third resistor to adjust the speed of said motor.

5. A motor control circuit as described in claim 1 including a thermistor in parallel with the third resistor for temperature compensation.

6. A motor control circuit as described in claim 2 including a fifth resistor in series with the light source to limit the current through the light source.